United States Patent [19]

Duran et al.

[11] Patent Number: 5,730,540
[45] Date of Patent: Mar. 24, 1998

[54] HOLE FILLING RECEPTACLE ASSEMBLY

[75] Inventors: John A. Duran, Glendora; Peter D. Chang, N. Hollywood, both of Calif.; R. Kendall Cox, Fort Worth, Tex.

[73] Assignee: Lockheed Martin Corporation, Fort Worth, Tex.

[21] Appl. No.: 711,321

[22] Filed: Sep. 3, 1996

[51] Int. Cl.⁶ ............................ F16D 1/00; F16B 13/06
[52] U.S. Cl. .................... 403/21; 403/297; 403/260; 411/55; 411/112
[58] Field of Search ........................... 403/12, 21, 297, 403/337, 260, 258, 408.1; 411/55, 60, 61, 111, 112, 113, 183, 352, 353

[56] References Cited

U.S. PATENT DOCUMENTS

| | | |
|---|---|---|
| 2,203,178 | 6/1940 | Peirce ............................ 411/55 X |
| 3,145,753 | 8/1964 | Kreider . |
| 3,192,820 | 7/1965 | Pitzer . |
| 3,345,900 | 10/1967 | Villo ............................ 411/55 X |
| 3,373,648 | 3/1968 | Pitzer . |
| 3,603,626 | 9/1971 | Whiteside .................. 411/60 X |
| 3,670,796 | 6/1972 | Grimm ........................ 411/112 |
| 3,783,922 | 1/1974 | Petrus ........................ 411/111 |
| 4,089,613 | 5/1978 | Babbitt, Jr. . |
| 4,571,133 | 2/1986 | Lindow . |
| 4,830,557 | 5/1989 | Harris et al. ............... 411/113 |
| 4,883,395 | 11/1989 | Klaric ......................... 411/55 |
| 5,042,888 | 8/1991 | Shinjo ......................... 411/55 X |
| 5,096,349 | 3/1992 | Landy et al. .............. 411/113 X |
| 5,193,956 | 3/1993 | Duran . |
| 5,224,806 | 7/1993 | Duran . |
| 5,397,078 | 3/1995 | Eilenstein-Wiegmann et al. ... 411/112 X |
| 5,405,228 | 4/1995 | Reid et al. ................. 411/113 X |

Primary Examiner—Kenneth J. Dorner
Assistant Examiner—William L. Miller
Attorney, Agent, or Firm—James E. Bradley

[57] ABSTRACT

A fastener assembly having a receptacle attached to the underside of a first panel aligned with a first hole adapted to receive therein a threaded bolt extending through a second hole in a second panel. The holes are aligned and a spring-biased expandable bushing, associated with the receptacle, extends into the first hole receiving the bolt therethrough. When the bolt is threaded into the receptacle, the nut is drawn up, compressing the spring and biasing the bushing, expanding the same, completely, filling the first hole and providing a firm locking engagement therein.

19 Claims, 4 Drawing Sheets

HOLE FILLING RECEPTACLE ASSEMBLY

BACKGROUND OF THE INVENTION

1. Field of the Invention

The invention relates to receptacle assemblies, and, more particularly, to a hole filling receptacle assembly for use in aircraft or the like.

2. Description of the Prior Art

Aircraft have removable panels secured at various locations to the aircraft body. These panels are secured in place by various nuts, bolts, fasteners, mating receptacles, etc. In assembling such panels to the aircraft substructure, alignment problems may occur where the panels are to be affixed to the aircraft body. Thus, the holes in such panels and in the aircraft body, which must be in alignment to receive bolts and mating receptacles therein, are usually oversized to compensate for such misalignment.

It has been discovered that, because of such oversized holes, the aircraft substructure may prematurely develop cracks in the aluminum body surrounding such holes and prematurely fail. Thus, since aircraft are normally warranted by the aircraft manufacturer for a predetermined number of flight hours, such premature cracking and panel body failure is a serious problem. Over the years aircraft manufacturers have sought various solutions to this problem such as making the panels or body structure thicker.

There thus exists a need for a receptacle assembly that can fill completely such holes in the aircraft body so that premature cracking and subsequent failure of the body structure is prevented.

SUMMARY OF THE INVENTION

It is an object of this invention to provide a receptacle assembly for completely filling a hole in an aircraft body. It is a further object of this invention to provide a receptacle assembly as in the foregoing object which may be quickly and easily assembled and disconnected to the aircraft panel and aircraft body structures.

These and other objects are preferably accomplished by providing a receptacle assembly having a receptacle attached to the underside of a first panel aligned with a first hole adapted to receive therein a threaded bolt extending through a second hole in a second panel. The holes are aligned and a spring-biased expandable bushing, associated with the receptacle, extends into the first hole receiving the bolt therethrough. When the bolt is threaded into the receptacle, the nut is drawn up, compressing the spring biasing the bushing, expanding the same completely, filling the first hole and providing a firm locking engagement therein.

DETAILED DESCRIPTION OF THE INVENTION

Figure 1:
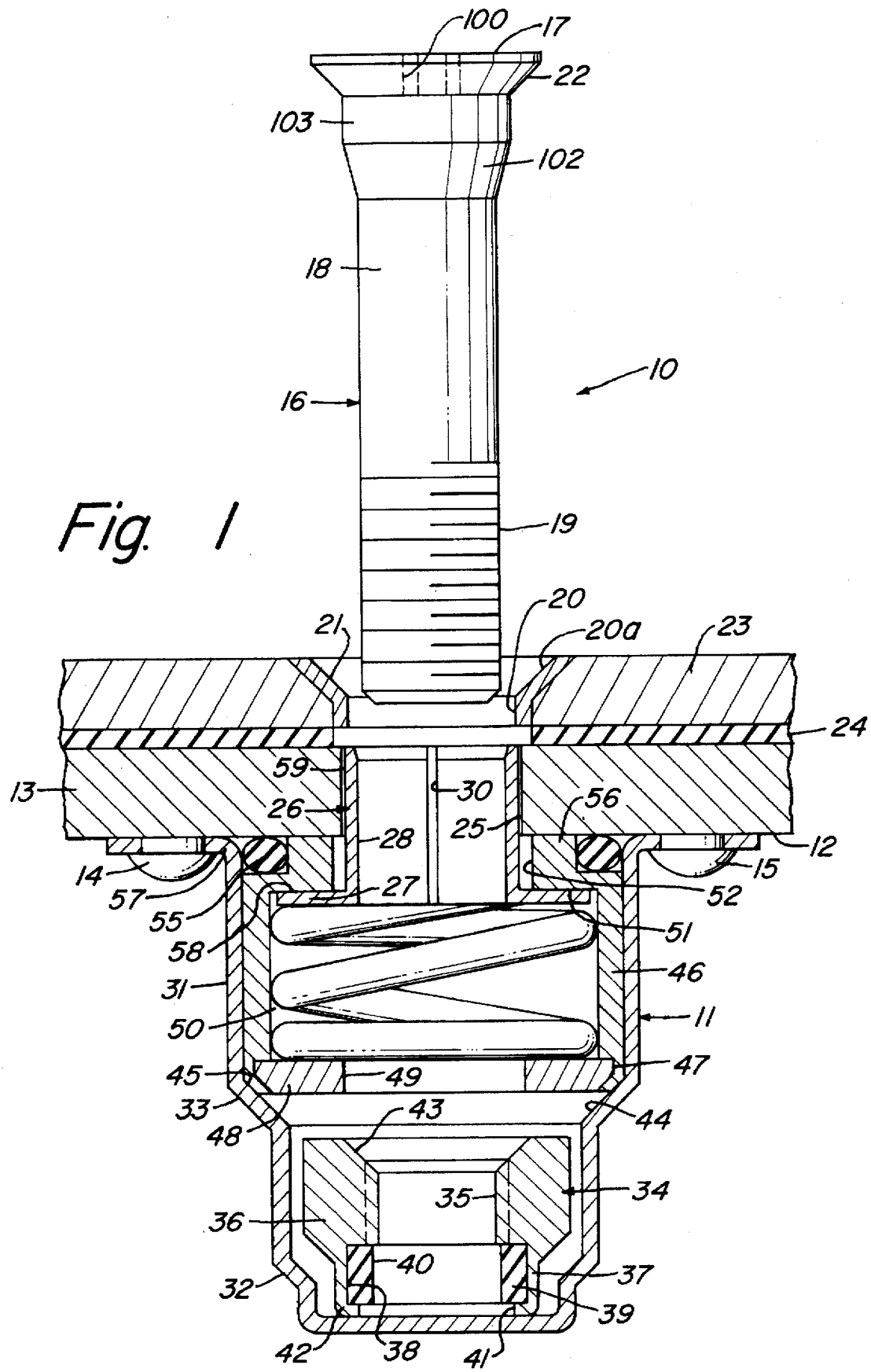
FIG. 1 is an elevational view, partly in section, of a receptacle assembly shown as mounted to a portion of the panel of an aircraft disposed against a portion of an aircraft body substructure.

Referring now to FIG. 1 of the drawing, a receptacle assembly 10 in accordance with the teachings of the invention is shown. Assembly 10 includes a receptacle 11 mounted to the underside 12 of a panel 13 by rivets 14, 15, or the like, which panel 13 may be part of an aircraft substructure.

A bolt 16 is shown adapted to engage receptacle 11. Bolt 16 includes an enlarged head 17, an integral shank portion 18, and an integral threaded portion 19. Threaded portion 19 is shown in FIG. 1 as extending into a hole 20 of a grommet 21, having a tapered counterbore 20a for conforming to the tapered underside 22 of head 17. Grommet 21 locates within a hole in an aircraft panel 23 and for purposes herein should be considered a part of panel 23. Grommet 21 distributes load over a larger area than a hole without a grommet, however is optional. A tapered portion 102 is provided above shank portion 18 and upper cylindrical portion 103 integral with tapered portion 22. As is well known in the aircraft art, a resilient seal 24 may be provided between abutting panel 23 and the aircraft substructure 13. A socket, such as a hex-shaped socket 100, is provided in head 17 for receiving a tool therein.

A hole 25 is provided in substructure 13 aligned with hole 20. As heretofore discussed, hole 25 is usually oversized to accommodate for slight misalignment of hole 20 with hole 25 when the panels 23 are mounted to the aircraft body substructure 13.

Figure 4:
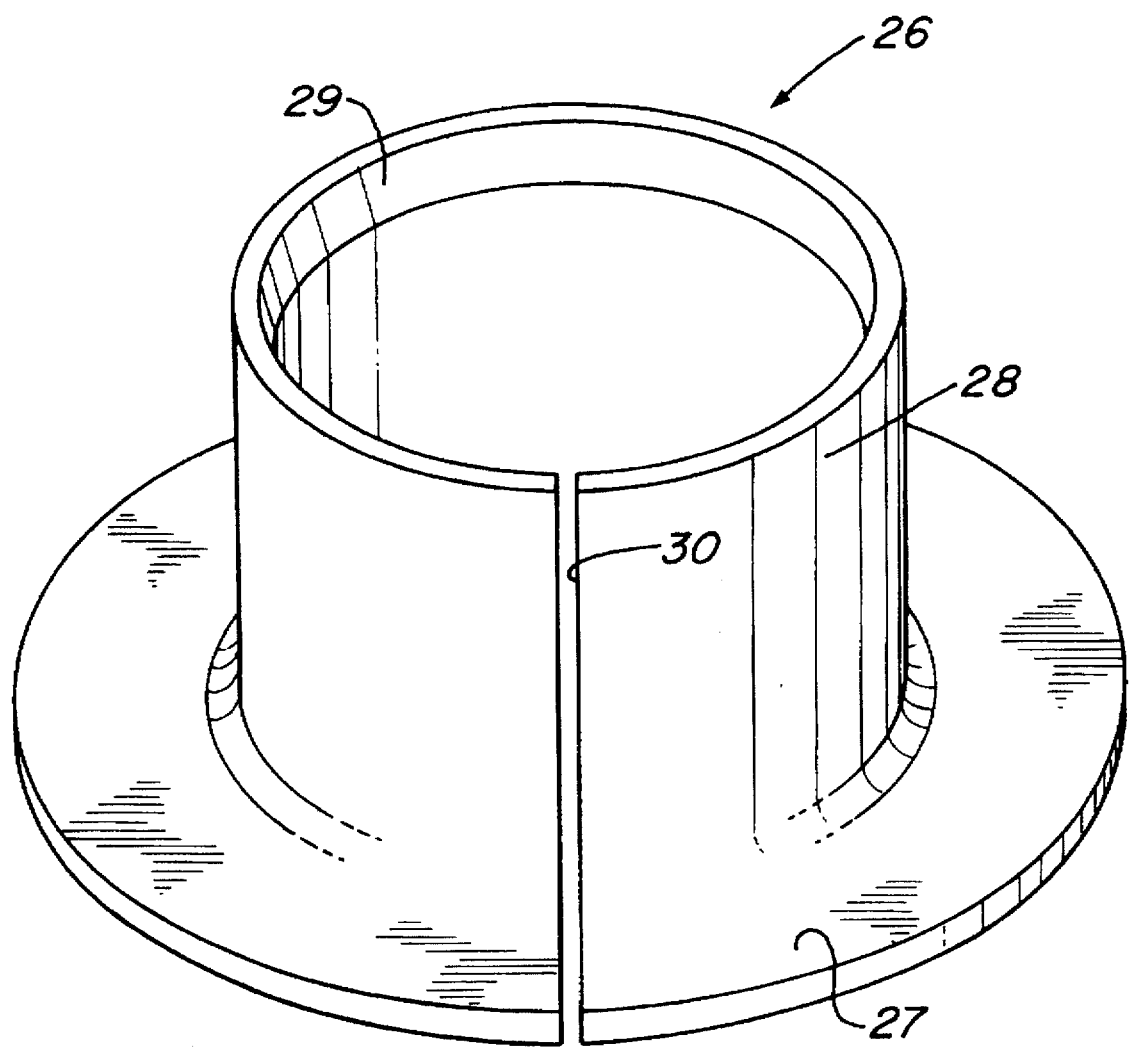
FIG. 4 is a perspective view of the expandable bushing alone of the receptacle assembly of FIGS. 1 through 3.

As particularly contemplated in the present invention, an expandable bushing 26 (see FIG. 4) is mounted in hole 25. Expandable bushing 26 includes a first generally flat round base portion 27 having an integral generally cylindrical centrally mounted ring portion 28. A throughbore 29 extends through bushing 26. A split 30 is also provided through bushing 26, axially as shown, extending completely therethrough. As seen in FIG. 1, the ring portion 28 extends upwardly from base portion 27 into hole 25.

Receptacle 11 has a first upper body portion 31 and a second lower integral body portion 32 with a tapered portion 33 leading from upper body portion 31 to lower body portion 32. As seen in FIG. 1, the outer diameter of lower body portion 32 may be less than the outer diameter of upper body portion 31.

A floating nut 34 is disposed in lower body portion 32 having a threaded throughbore 35 adapted to mate with the threaded portion 19 of bolt 16 as will be discussed. Nut 34 has an upper main body portion 36 (through which throughbore 35 extends) and a lower integral body portion 37 having an interior cavity 38 receiving a resilient sealing ring or insert 39 therein. Insert 39 has a central hole 40, aligned with both throughbore 35 and an opening 41 in the lower wall 42 of lower body portion 37. Opening 41 is also aligned with hole 40 and throughbore 35. Also, a countersunk opening 43 is provided in upper body portion 34 leading into throughbore 35.

Nut 34 is capable of floating a slight distance axially up and down relative to lower body portion 37. However, nut 34 is not allowed to rotate because of flats formed in lower body portion 37 that mate with the flats on the exterior of nut 34. Resilient insert 39 creates friction on the bolt 16 as it mates with nut 34. This friction provides a self-locking feature, ensuring that nut 34 and bolt 16 do not separate during vibration.

The inner wall 44 of tapered portion 33 is also tapered and adapted to receive thereon the angled lower end 45 of a retainer 46 mounted in the upper portion 31 of receptacle 11. This lower end 45 may be undercut, as at undercut 47, for receiving a washer 48 therein. Washer 48 has a central opening 49 also aligned with throughbore 35 and throughbore 29 in bushing 26.

Bushing 26 is biased upwardly by a coil spring 50 mounted in the interior of retainer 46. Retainer 46 has an upper wall 51 with an opening 52 therein aligned with throughbore 29 in bushing 26. As seen in FIG. 1, the flat base portion 27 of bushing 26 abuts against wall 51 and is retained thereagainst by spring 50 which is in engagement with base portion 27. The other or lower end of spring 50 abuts against washer 48, as shown. The throughbore of spring 50 is adapted to receive threaded portion 19 therethrough.

Finally, a resilient O-ring seal 55 is provided encircling the upper cylindrical portion 56 of retainer 46 between the interior of the upper end 57 of receptacle 11 and the outer wall of portion 56 as shown. Seal 55 also abuts against the underside 12 of panel 13 and the upper shoulder 58 of retainer 46. Any suitable materials may be used. Bushing 26 may be made of 17-4 Ph stainless steel material.

Figure 2:
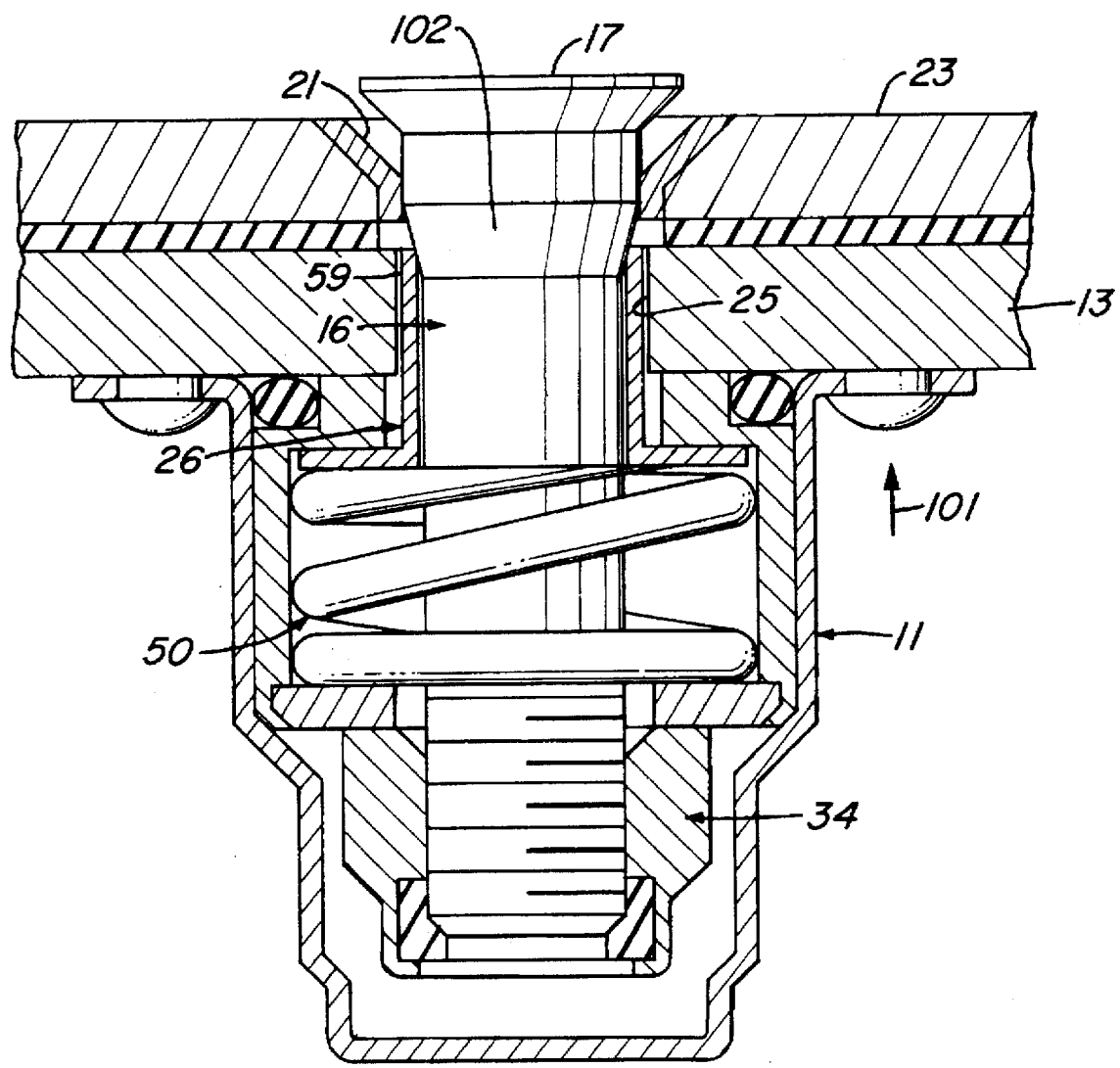
FIG. 2 is a view similar to FIG. 1, showing a second position in the installation of the receptacle assembly of FIG. 1.

In operation, receptacle 11 is mounted to panel 13 as heretofore discussed. As seen in FIG. 1, bolt 16 is shown in an unthreaded relationship to nut 34. In this unengaged position, an appreciable gap 59 is provided between the outer wall of cylindrical ring portion 28 of bushing 26 and the walls of hole 25. A tool (not shown) is inserted into socket 100 in head 17 and bolt 16 is pushed down through bushing 26, spring 50, opening 49 in washer 48, and into threaded engagement with threaded throughbore 35 in nut 34. Bolt 16 is now tightened into nut 34 by rotating the same and the upper end of ring portion 28 of bushing 26 abuts against the tapered portion 102 of bolt 16 and begins to expand outwardly as seen in FIG. 2, thus filling hole 25 (it can be seen in FIG. 2 that the head 17 of bolt 16 is not yet sealed in counterbore 20a but gap 59 has begun to narrow). As nut 34 is drawn upwardly in the direction of arrow 101 in FIG. 2, spring 50 is compressed, biasing bushing 26 also upwardly, which results in outward expansion of bushing 26.

Figure 3:
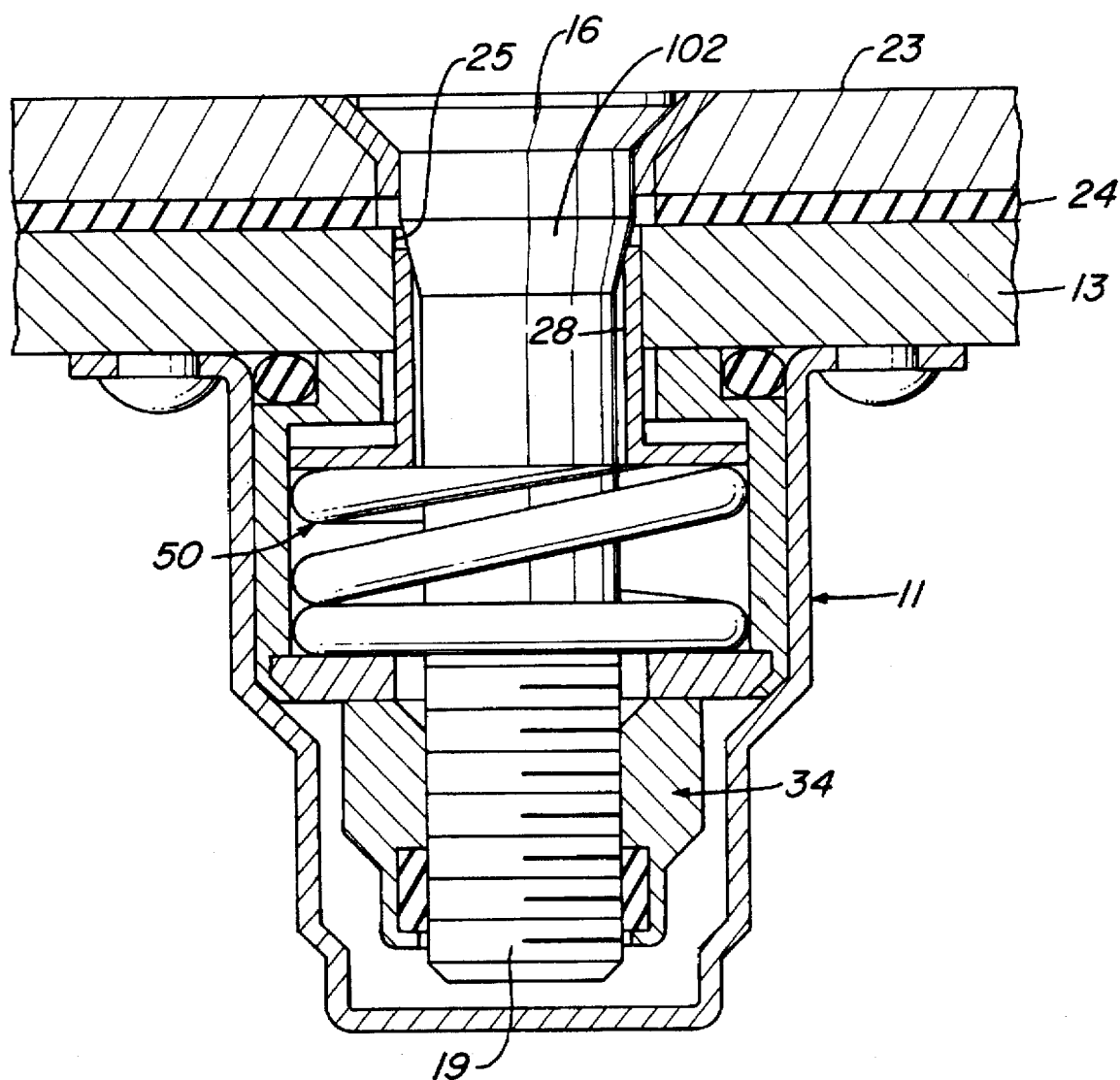
FIG. 3 is a view, similar to FIG. 1, showing the final installed position of the receptacle assembly of FIG. 1.

The final installed position is shown in FIG. 3 where threaded portion 19 of bolt 16 is completely threaded to nut 34. Gap 59, as seen in FIGS. 1 and 2, is not visible since bushing 26 has completely expanded when the upper end of ring portion 28 rides up over the tapered portion 102 of bolt 16, forcing the same outwardly against the surrounding walls of hole 25, completely filling the spacing between ring portion 28 and hole 25. Panel 23 is now clamped securely to substructure 13. The ring portion 28 of bushing 26 has completely filled the oversized hole 25 in substructure 13 enhancing the localized stress concentration problem encountered in such aircraft installations. Spring 50 compensates for variations and tolerances in panel/substructure differences in thickness. Bolt 16 is quickly and easily installed to nut 34 compensating for misaligned and oversized holes thereby reducing residual stress.

In conclusion, as nut 34 is drawn upwardly, spring 50 is compressed and tightening of bolt 16 is continued until bolt head 17 is completely sealed and bushing 26 has fully radially expanded. The invention herein may be used in aluminum or composite aircraft panels.

Although there is disclosed herein a preferred embodiment of the invention, variations thereof may occur to an artisan and the scope of the invention should only be limited to the scope of the appended claims.

We claim:

1. A fastener assembly for securing a panel to a substructure, the panel and substructure having holes which generally align, the hole of the substructure being larger in diameter than the hole of the panel, the fastener assembly comprising:

a bolt having an enlarged head at one end, an elongated generally cylindrical shank portion, an integral tapered portion interconnecting the shank portion to the head, and an integral threaded portion extending from the shank portion;

an expandable bushing;

a nut having a threaded throughbore; and a receptacle adapted to be mounted to the substructure for carrying the nut in an initial position spaced below the substructure in alignment with the hole in the substructure; and a spring in the receptacle between the nut and the bushing for maintaining the bushing within the hole in the substructure, such that when the threaded portion of the bolt is threaded into engagement with the nut, the nut is drawn upwardly from the initial position toward the substructure and the tapered portion of the bolt expands the bushing outward against the walls of the hole in the substructure before the bolt has been fully threaded into the nut.

2. A fastener assembly for securing a panel to a substructure, the panel and substructure having holes which generally align, the hole of the substructure being larger in diameter than the hole of the panel, the fastener assembly comprising:

a bolt having an enlarged head at one end, an elongated generally cylindrical shank portion, an integral tapered portion interconnecting the shank portion to the head, and an integral threaded portion extending from the shank portion;

an expandable bushing;

a nut having a threaded throughbore;

means adapted to be mounted to the substructure for carrying the nut in an initial position spaced below the substructure in alignment with the hole in the substructure;

means for maintaining the bushing within the hole in the substructure, such that when the threaded portion of the bolt is threaded into engagement with the nut, the nut is drawn upwardly from the initial position toward the substructure and the tapered portion of the bolt expands the bushing outward against the walls of the hole in the substructure before the bolt has been fully threaded into the nut; wherein the means for carrying comprises:

a receptacle adapted to be mounted to a lower side of the substructure, the receptacle having a lower portion within which the nut floats; and wherein the means for maintaining comprises:

resilient means in the receptacle for urging the bushing upward relative to the receptacle.

3. The fastener assembly according to claim 2 wherein the resilient means comprises:

a coil spring carried in the receptacle for urging the bushing upward relative to the receptacle.

4. A fastener assembly for securing a panel to a substructure, the panel and substructure having holes which generally align, the hole of the substructure being larger in diameter than the hole of the panel, the fastener assembly comprising:

a bolt having an enlarged head at one end, an elongated generally cylindrical shank portion, an integral tapered portion interconnecting the shank portion to the head, and an integral threaded portion extending from the shank portion;

a receptacle adapted to be mounted to the underside of the substructure, the receptacle having an upper body portion and an integral lower body portion;

a floating nut having a threaded throughbore mounted in the lower body portion;

an expandable bushing having a first ring portion with an outer wall adapted to be disposed in the hole in the substructure and an integral lower portion greater in outer diameter than an outer diameter of the ring portion and disposed in the upper portion of the receptacle;

resilient means mounted in the upper portion of the receptacle having one end engaging the lower portion of the bushing and another end abutting against stop means mounted in the receptacle for normally biasing the bushing toward the substructure; and the stop means, the ring portion and the resilient means each having throughbores for receiving the threaded portion of the bolt therethrough whereby, when the threaded portion of the bolt is threaded into engagement with the nut, the nut is drawn upwardly toward the bolt, compressing the resilient means and expanding the ring portion outwardly toward a peripheral wall of the hole in the substructure when the ring portion engages the tapered portion of the bolt, until the spacing between the peripheral wall of the hole through the substructure and an outer wall of the ring portion is completely filled.

5. The fastener assembly of claim 4 wherein the bolt head is tapered on an underside of the head for mating engagement with a countersink formed in the panel.

6. The fastener assembly of claim 4 wherein a retainer is mounted in the upper portion of the receptacle, the retainer having an upper wall with the lower portion of the bushing bearing thereagainst and a lower portion having an undercut receiving the stop means therein, the retainer having a throughbore aligned with the throughbores in the bushing, the resilient means and the stop means.

7. The fastener assembly of claim 6 wherein the stop means is a washer mounted in the undercut, the retainer has a lowermost end tapering inwardly toward a center longitudinal axis thereof, the upper and lower portions of the receptacle are connected by a tapered portion having an inner wall, the lowermost end of the retainer bearing against the inner wall.

8. The fastener assembly of claim 7 wherein the lower body portion of the receptacle is lesser in outer diameter than the outer diameter of the upper body portion thereof.

9. The fastener assembly of claim 4 wherein the floating nut includes a main body portion having the threaded throughbore and an integral lower body portion having a resilient insert mounted therein, the insert having a hole therethrough aligned with the throughbore in the nut.

10. The fastener assembly of claim 4 wherein the ring portion is a split ring.

11. The fastener assembly of claim 4 wherein the resilient means comprises a helical spring.

12. The fastener assembly of claim 4 wherein the resilient means comprises a helical spring having a throughbore of a diameter slightly greater than the outer diameter of the threaded portion of the bolt for receiving the threaded portion of the bolt therethrough.

13. A fastener assembly comprising:

a bolt having an enlarged head at one end, an elongated generally cylindrical shank portion, an integral tapered portion interconnecting the shank portion to the head, and an integral threaded portion extending from the shank portion;

a receptacle, the receptacle having an upper body portion and an integral lower body portion;

a floating nut having a threaded throughbore mounted in said lower body portion;

an expandable bushing having a first ring portion with an outer wall and an integral lower portion greater in outer diameter than the outer diameter of said ring portion disposed in the upper portion of said receptacle;

resilient means mounted in the upper portion of said receptacle having one end engaging said lower portion of said bushing and another end abutting against stop means mounted in said receptacle for stopping the downward movement of said resilient means, normally biasing said bushing toward said bolt; and said stop means, said ring portion and said resilient means each having throughbores for receiving said threaded portion of said bolt therethrough whereby, when said threaded portion of said bolt is threaded into engagement with said nut, said nut is drawn upwardly toward said bolt, compressing said resilient means and expanding said ring portion outwardly when the ring portion engages the tapered portion of said bolt.

14. The fastener assembly of claim 13 wherein a retainer is mounted in the upper portion of said receptacle, said retainer having an upper wall with said lower portion of said bushing bearing thereagainst and a lower portion having an undercut receiving said stop means therein, said retainer having a throughbore aligned with the throughbores in said bushing, said resilient means and said stop means.

15. The fastener assembly of claim 14 wherein said stop means is a washer mounted in said undercut, said retainer has a lowermost end tapering inwardly toward a center longitudinal axis thereof, said upper and lower portions of said receptacle being connected by a tapered portion having an inner wall, and the lowermost end of said retainer bearing against said inner wall.

16. The fastener assembly of claim 15 wherein the lower body portion of the receptacle is lesser in outer diameter than the upper body portion thereof.

17. The fastener assembly of claim 13 wherein the floating nut includes a main body portion having the threaded throughbore and integral lower body portion having a resilient insert mounted therein, the insert having a hole therethrough aligned with the throughbore in the nut.

18. The fastener assembly of claim 13 wherein the ring portion is a split ring.

19. The fastener assembly of claim 13 wherein the resilient means comprises a helical spring.

* * * * *